US012778111B1

(12) United States Patent
Xie et al.

(10) Patent No.: US 12,778,111 B1
(45) Date of Patent: Nov. 3, 2026

(54) METHOD FOR ELECTROSHOCK RODENTS USING A MILLIMETER-WAVE RADAR AND RELATED EQUIPMENT

(71) Applicant: Logicarer Biotechnology (Shenzhen) Co., Ltd, Shenzhen (CN)

(72) Inventors: Zhen Xie, Shenzhen (CN); Chenghong Xie, Shenzhen (CN); Xiaojie Deng, Shenzhen (CN); Hai Huang, Shenzhen (CN)

(73) Assignee: Logicarer Biotechnology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 19/260,805

(22) Filed: Jul. 7, 2025

(30) Foreign Application Priority Data

May 15, 2025 (CN) ........................ 202510632570.0

(51) Int. Cl.
*A01M 23/38* (2006.01)
*A01M 31/00* (2006.01)
*G01S 13/88* (2006.01)

(52) U.S. Cl.
CPC .......... *A01M 23/38* (2013.01); *A01M 31/002* (2013.01); *G01S 13/88* (2013.01)

(58) Field of Classification Search
CPC .... A01M 23/38; A01M 31/002; A01M 29/16; A01M 29/24; G01S 7/354; G01S 7/356; G01S 13/88
(Continued)

(56) References Cited

U.S. PATENT DOCUMENTS 5,075,759 A * 12/1991 Moline .................. H01L 24/49 361/813
5,450,063 A * 9/1995 Peterson .............. A01M 29/16 340/552

(Continued)

FOREIGN PATENT DOCUMENTS

CN 106577620 4/2017
CN 207626429 7/2018

(Continued)

OTHER PUBLICATIONS

Yair Richter et al., "Neural-Network-Based Target Classification and Range Detection by CW MMW Radar", pp. 1-22, remote sensing, Sep. 15, 2023.

*Primary Examiner* — Maria E Graber
(74) *Attorney, Agent, or Firm* — ScienBiziP, P.C.

(57) ABSTRACT

The present invention relates to a method for electroshock rodents using a millimeter-wave radar and related equipment using millimeter-wave radar. The method involves collecting dynamic parameters of a target object via a millimeter-wave radar, including radar cross-section (RCS), vital sign signals (e.g., respiration and heartbeat), and motion trajectory. A multi-modal feature fusion algorithm intelligently classifies the target object based on these parameters. When the target object is identified as a rodent, an electrode system applies a first voltage based on the rodent's size characteristics to electroshock the target object; if vital sign signals are still detected afterward, a higher second voltage is applied to deliver an enhanced electroshock, thereby improving the kill success probability. The system further incorporates a safety recognition mechanism for humans or pets to avoid accidental injury, ensuring user safety.

10 Claims, 8 Drawing Sheets

(58) Field of Classification Search
USPC ........................................................ 43/98, 112
See application file for complete search history.

(56) References Cited

U.S. PATENT DOCUMENTS

| | | | | |
|---|---|---|---|---|
| 6,730,858 | B2 * | 5/2004 | Gotoh | H05K 1/111 257/E21.511 |
| 7,888,180 | B2 * | 2/2011 | Nogi | H01L 24/97 438/114 |
| 8,375,626 | B2 * | 2/2013 | Borth | G01N 33/68 43/131 |
| 9,474,265 | B2 * | 10/2016 | Duncan | A01M 29/10 |
| 9,775,337 | B2 * | 10/2017 | Duncan | A01M 29/18 |
| 9,835,720 | B2 * | 12/2017 | Al-Alusi | G01S 17/89 |
| 10,299,374 | B2 * | 5/2019 | Shashkov | H05K 1/028 |
| 10,849,320 | B2 * | 12/2020 | Files | A01M 31/002 |
| 11,602,144 | B2 * | 3/2023 | Mueller | A01M 23/38 |
| 11,608,194 | B2 * | 3/2023 | Frucht | H04N 5/77 |
| 12,171,215 | B2 * | 12/2024 | Daubeney | H04R 1/403 |
| 12,310,718 | B2 * | 5/2025 | Yang | G06F 18/20 |
| 12,376,580 | B1 * | 8/2025 | Luo | A01M 23/38 |
| 2015/0323649 | A1 * | 11/2015 | Lee | G01S 13/584 342/27 |
| 2019/0166823 | A1 * | 6/2019 | Dick | G06F 18/24133 |
| 2020/0037603 | A1 * | 2/2020 | Felton-Armouti | A01M 29/12 |
| 2020/0154696 | A1 * | 5/2020 | Carnell | G06V 40/10 |
| 2024/0114890 | A1 * | 4/2024 | Vickery | G06V 20/52 |
| 2024/0147983 | A1 * | 5/2024 | Krehel | A01M 31/002 |
| 2024/0359621 | A1 * | 10/2024 | Jagbrant | G08G 1/0112 |
| 2025/0118185 | A1 * | 4/2025 | Dave | G01S 13/42 |

FOREIGN PATENT DOCUMENTS

| | | | | |
|---|---|---|---|---|
| CN | 109006782 | | 12/2018 | |
| WO | WO-2025144061 | A1 * | 7/2025 | G06V 40/23 |

* cited by examiner

METHOD FOR ELECTROSHOCK RODENTS USING A MILLIMETER-WAVE RADAR AND RELATED EQUIPMENT

CROSS-REFERENCE TO RELATED APPLICATIONS

This application claims priority to Chinese Patent Application No. 202510632570.0 filed on May 15, 2025, in China National Intellectual Property Administration, the contents of which are incorporated by reference herein.

FIELD

This disclosure relates to animal detection and extermination technologies, and in particular to an electroshock rodent-catching method and related equipment that combine millimeter-wave radar sensing with artificial intelligence classification algorithms.

BACKGROUND

Conventional electric rodent traps often rely on infrared sensors, laser beams or pressure sensors to detect the presence of rodents. These detection methods have high false alarm rates and use fixed electroshock strategies, so if the first shock fails there is no adaptive remedy, resulting in low kill efficiency. Moreover, existing traps lack mechanisms to prevent accidental injury to humans or pets in the vicinity.

SUMMARY

In view of the above problems, there is a need for a rodent electroshock method and related equipment with high-precision target recognition, adaptive shock intensity control, and fail-safe mechanisms to avoid collateral harm. The present disclosure provides such a system and method to address the issues of imprecise detection, uncontrolled kill effectiveness, and poor safety in the prior art.

According to a first aspect, an electroshock rodent-catching device is provided. The device comprises an electrode array, and further includes a millimeter-wave radar and a controller. The millimeter-wave radar obtains dynamic parameters of a target object, the dynamic parameters including at least one of: radar cross-section (RCS), vital sign signals, and motion trajectory. The controller classifies the target object based on the dynamic parameters. When a target object is classified as a rodent, the controller controls electrodes of the electrode array to output a first voltage to deliver an electric shock to the target object. If after the first shock it is detected that the target object still exhibits a vital sign signal, the controller outputs a second voltage higher than the first voltage to electroshock the target object again.

In some embodiments of the device, a fence is provided around the periphery of the electrode array. When a target object is classified as a rodent, the controller additionally controls a gate system of the fence to close, confining the rodent. In some embodiments, the electrodes of the electrode array are interconnected by telescopic rods. The controller can determine the size of the target object from the dynamic parameters and, based on the size, control a drive mechanism to adjust the spacing between the electrodes. In some embodiments, the electrode is composed of a gold-plated copper foil layer and a ceramic insulating layer (e.g., a nano-ceramic insulating layer for preventing electrical leakage).

According to a second aspect, a method for electroshock rodents based on millimeter-wave radar is provided. The method includes: collecting dynamic parameters of a target object through a millimeter-wave radar (the dynamic parameters including at least one of RCS, vital sign signals, and motion trajectory); classifying the target object based on the dynamic parameters using a multi-modal feature fusion algorithm; When a target object is classified as a rodent, controlling an electrode to output a first voltage to electroshock the target object; and if after the shock the target object still exhibits a vital sign signal, outputting a second, higher voltage to electroshock the target object again.

In some embodiments of the method, the procedure further includes: determining the target object's mass from its radar cross-section, and obtaining the distance between the target object and the radar, then determining the appropriate first voltage based on the distance and the mass. In some embodiments, determining the target's category using the multi-modal feature fusion algorithm can involve analyzing one or more of the target's RCS, vital sign, and motion trajectory parameters. For example, if the target object's RCS is within a first specified range, its respiratory and heart rates are within respective first ranges, its movement speed is below a first speed threshold, and its acceleration is above a first acceleration threshold, then the target object can be classified as a rodent. In some embodiments, specific threshold values are used for classification—e.g., a first cross-sectional area range of 0.001 $m^2$-0.01 $m^2$, a first respiratory rate range of 1 Hz-3 Hz, a first heart rate range of 5 Hz-9 Hz, a first speed threshold of 2 m/s, and a first acceleration threshold of 1 $m/s^2$. By way of example, if the target object has an RCS of 0.08 $m^2$, a respiratory rate of 3 Hz, a heart rate of 8 Hz, and (for this example) the first speed threshold is 1.5 m/s and the first acceleration threshold is 1.5 $m/s^2$, then because the target's RCS, respiratory rate, heart rate, speed, and acceleration satisfy the defined first-range conditions, the target object is determined to be a rodent. In some embodiments, the classification can alternatively be performed by a trained target recognition model (for example, a fused convolutional neural network (CNN) and recurrent neural network (RNN) model) that processes the dynamic parameters to output the target's category.

If the target object is determined to be a rodent, the method may further include additional adaptive actions. In some embodiments, the system can identify whether the rodent is a juvenile or an adult and select a different first voltage magnitude accordingly, outputting an appropriate first voltage to electroshock the target object based on its size category. This ensures the shock intensity is matched to the rodent's size, improving extermination efficacy. In some embodiments, the method includes adjusting the spacing between electrodes of the electrode array according to the size category of the rodent (using a driving mechanism to reposition the electrodes), thereby optimizing the electroshock effect for rodents of different sizes. In some embodiments, before delivering the shock, the system uses the radar to verify that the target object is within a predetermined area of the electrode array (for instance, the central region) and has remained there for longer than a preset time threshold (e.g., 3 seconds). Only when the target object is within the defined area for at least the threshold duration will the controller trigger the first voltage shock. Ensuring the rodent is well within the trap area for a sufficient time before energizing the electrodes can increase the likelihood of an effective kill (the preset area and time threshold can be user-configurable; for example, the central area of the electrode array and a 3-second dwell time).

According to a third aspect, an electroshock rodent-catching system is provided. The system comprises: a millimeter-wave radar module for collecting dynamic parameters of a target object; an analysis processing module that uses a multi-modal feature fusion algorithm to determine the category of the target object from the dynamic parameters; and an electrode control module for outputting a corresponding voltage to an electrode based on the classification result. The analysis processing module is further configured such that, when a target object is recognized as a human, the system immediately interrupts the high-voltage output of the electrodes to avoid shocking the person, and when a target object is recognized as a pet, the system initiates a repelling action to drive the pet away (for example, by sounding an alarm or other deterrent, as described below).

The present disclosure markedly improves rodent detection accuracy and kill efficiency. For instance, in one implementation under simulated home environments, the system achieved a rodent identification accuracy of about 94.7%, and by employing the two-stage electroshock (initial shock followed by a higher-voltage shock if needed), the extermination rate was increased to over 97%.

Moreover, the inclusion of safety recognition mechanisms for humans and pets provides an interlock that prevents accidental injury, ensuring the device can be used safely in household settings.

DETAILED DESCRIPTION

For a clearer understanding of the objectives, features, and advantages of the invention, the following detailed description is provided in conjunction with the accompanying drawings and specific embodiments. It should be noted that all technical and scientific terms used herein have the same meaning as commonly understood by one of ordinary skill in the art, unless otherwise defined. The terminology used in this description of the invention is for the purpose of describing particular embodiments only and is not intended to be limiting.

The terms "first," "second," "third," and so on (if used) in this description and the claims are used to distinguish between similar elements and not necessarily to indicate any particular order or sequence. Similarly, words such as "exemplary" or "for example" are intended to present concepts in a concrete fashion. Any embodiment or design described as "exemplary" or "for example" is not necessarily to be construed as preferred or advantageous over other embodiments or designs. Unless context dictates otherwise, singular forms of nouns may include their plural forms and vice versa.

Flowcharts or methods described in connection with embodiments of the present invention may include one or more steps. The order of steps presented is illustrative; steps can be performed in a different sequence, combined, or some steps omitted without departing from the scope of the claimed invention. Features described in the various embodiments can be combined with one another as long as such combination does not conflict.

Existing electric rodent trap devices often use infrared, laser, or pressure sensors to detect rodents, which can lead to high false trigger rates and fixed electroshock strategies. If the first shock fails to kill the rodent, conventional devices lack any remedial mechanism, resulting in low extermination efficiency, and they cannot avoid accidental shocks to humans or pets. To solve these technical problems, the present invention provides an improved electroshock rodent-catching system.

Figure 1:
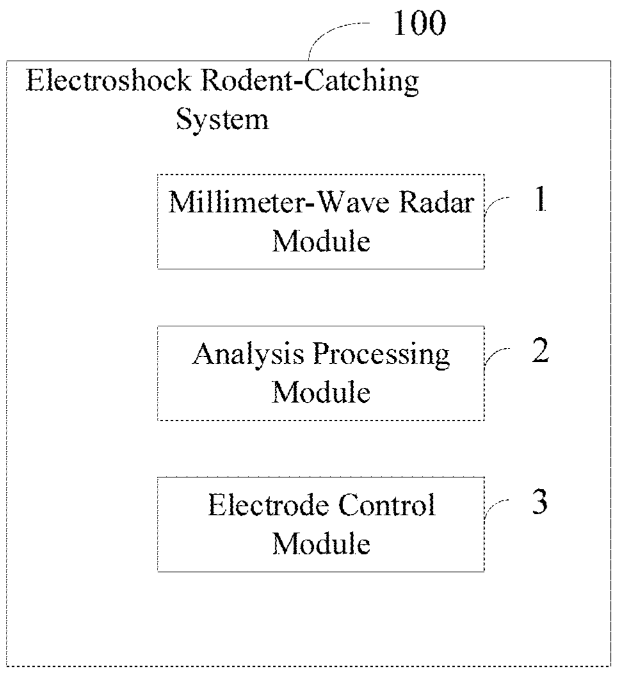
FIG. 1 is a schematic structural diagram of an electroshock rodent-catching system according to some embodiments of the present invention.

Referring to FIG. 1, an embodiment of the electroshock rodent-catching system 100 is shown in schematic form. The system 100 includes a millimeter-wave radar module 1, an analysis processing module 2, and an electrode control module 3.

In some embodiments, the millimeter-wave radar module 1 performs multi-band coordinated scanning to collect dynamic parameters of a target object. The dynamic parameters may include at least one of: radar cross-section (Radar Cross Section, RCS), vital sign signals, and motion trajectory. For example, the millimeter-wave radar module 1 can operate in the 24 GHz, 60 GHz, and 77 GHz bands in a coordinated manner to detect one or more target objects. The radar module 1 can include a multiple-input multiple-output (MIMO) antenna array. By using the MIMO antenna array, the radar's detection resolution, range, and anti-interference capability are enhanced. It also allows rapid beam switching to achieve efficient multi-target tracking and wide-area coverage.

In some embodiments, the millimeter-wave radar module 1 may comprise one or more radar units. The radar emits electromagnetic waves of a specific frequency (for example, a frequency-modulated continuous wave or pulsed wave) as a transmission signal, and the transmission power is recorded. The radar waves are radiated directionally or omnidirectionally through the MIMO antenna array. When a target object is illuminated by the radar, it reflects an echo signal back to the radar. The radar receives the echo signal returned from the target object, records the echo signal's received power, and measures the time delay between transmitting the transmission signal and receiving the echo signal. Based on the round-trip time delay, the radar determines the distance from the radar to the target object. Using the radar range equation, and based on the target's reflected power, the measured distance, the transmitted power, the antenna gain of the MIMO array, and the wavelength of the electromagnetic waves, the system computes the target object's radar cross-sectional area (RCS).

In some embodiments, if the target object is a living being, micro-motions of the target's chest or heart will induce slight frequency modulations in the returned radar echo (i.e., a micro-Doppler effect). The millimeter-wave radar analyzes the frequency variations in the target's echo signal to extract the target's breathing (respiratory) rate and heart rate, and uses at least one of these as the target's vital sign signal. For example, the radar can apply signal processing techniques such as Short-Time Fourier Transform (STFT) or Empirical Mode Decomposition (EMD) to isolate the micro-motion components in the echo signal, and then use a peak detection algorithm (e.g., an autocorrelation-based algorithm) to calculate the target's respiratory rate and heart rate.

In some embodiments, upon receiving the target's echo signal, the radar determines the frequency offset (e.g., Doppler shift) between the transmitted signal and the echo signal. Based on the frequency offset, the radar computes the target object's movement speed and acceleration. The system can use at least one of the movement speed or acceleration as a parameter representing the target's motion trajectory.

The analysis processing module 2 uses the dynamic parameters obtained from the radar to determine the category of the target object through a multi-modal feature fusion algorithm. In one embodiment, the analysis processing module 2 incorporates a fusion algorithm model combining a convolutional neural network (CNN) and a recurrent neural network (RNN). The analysis module 2 processes the input dynamic parameters of the target object through the fused model to output the category (such as "rodent," "human," "pet," etc.) of the target. In other embodiments, the fusion algorithm model can be deployed on an edge computing chip (for example, a Kendryte K210 AI chip) or an embedded ARM-based platform for real-time processing.

The electrode control module 3 is configured to control the output of the electrode array based on the classification result of the target object.

In some embodiments, the analysis processing module 2 is further configured such that, when the target object is identified as a human, it will cause the electrode control module 3 to interrupt the voltage output of the electrodes (immediately cutting off power to the electrode array), or when the target object is identified as a pet, it will cause a connected acoustic device to emit a sound wave to drive the target away. In an example implementation, the analysis module 2 may be realized by a processor, and the acoustic device can be a speaker or buzzer.

Figure 2:
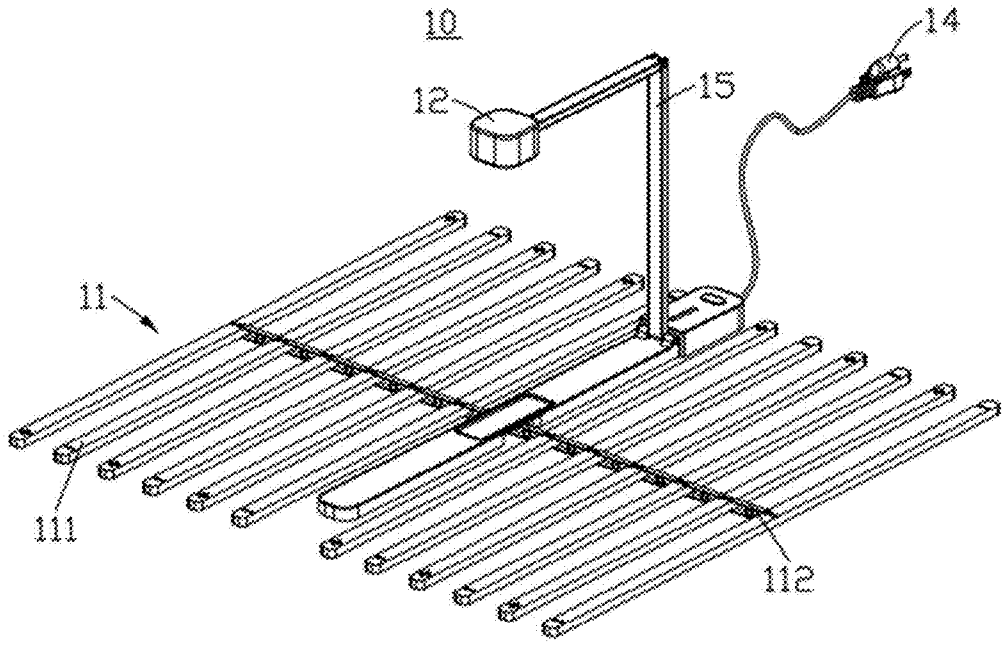
FIG. 2 is a schematic structural diagram of an electroshock rodent-catching device according to some embodiments of the present invention.

Referring to FIG. 2, a schematic of an electroshock rodent-catching device 10 according to some embodiments is shown. The device 10 includes an electrode array 11, a millimeter-wave radar 12, a controller 13 (see also FIG. 3), a power plug 14, and a mounting bracket 15. The power plug 14 is designed to connect to a power source and supply power to the electrode array 11. In some embodiments, when the power plug 14 is connected to mains power, that power source can also supply the millimeter-wave radar 12 and the controller 13. In other embodiments, the device 10 may omit the power plug 14; instead, the millimeter-wave radar 12 and the controller 13 are powered by an internal independent power supply (for example, an internal battery pack).

In some embodiments, the millimeter-wave radar 12 is affixed within the mounting bracket 15, oriented such that it can illuminate the area of the electrode array 11. The radar 12's beam coverage in one example is about 1 m×90°, where 1 m represents the effective detection range in either the horizontal or vertical direction, and 90° represents the beam's coverage angle in the horizontal plane (azimuth). The mounting bracket 15 can serve to conveniently position or mount the device 10 in a desired location (for instance, the user can attach the device to a wall or place it on a surface at a target location using the bracket).

Figure 3:
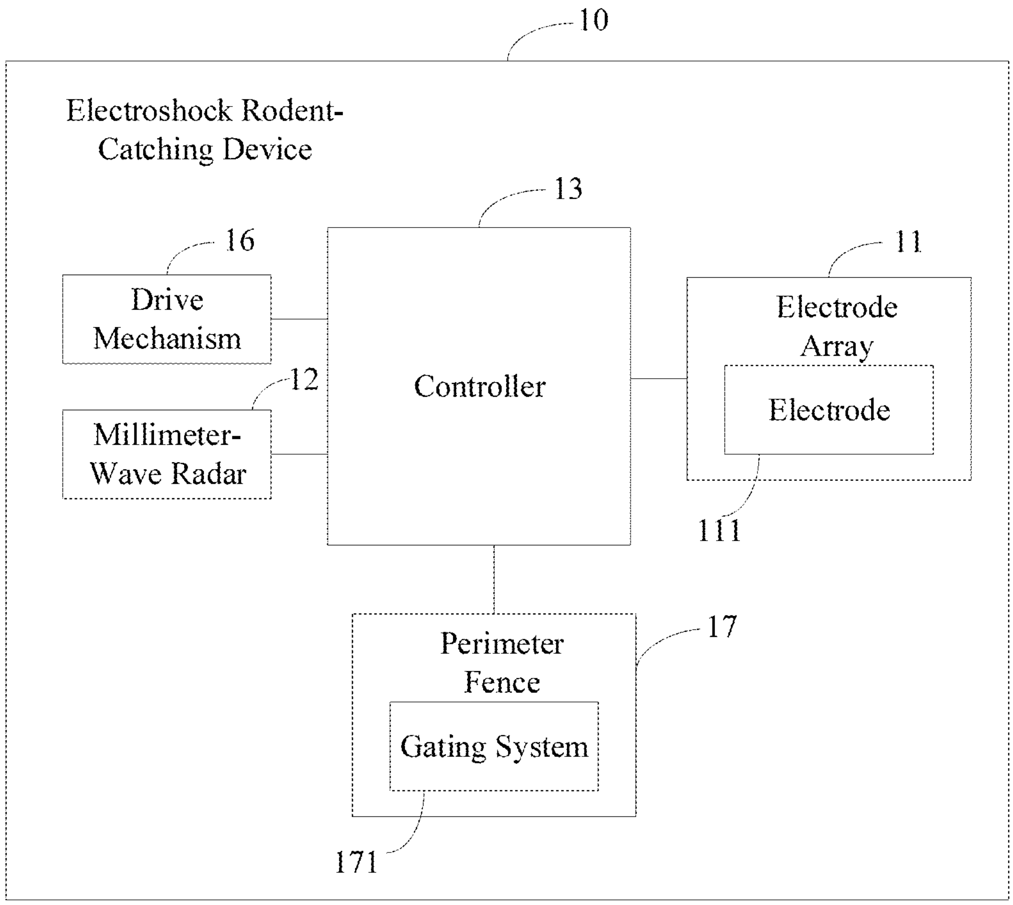
FIG. 3 is a schematic diagram of functional modules of the electroshock rodent-catching device according to some embodiments.
Figure 4:
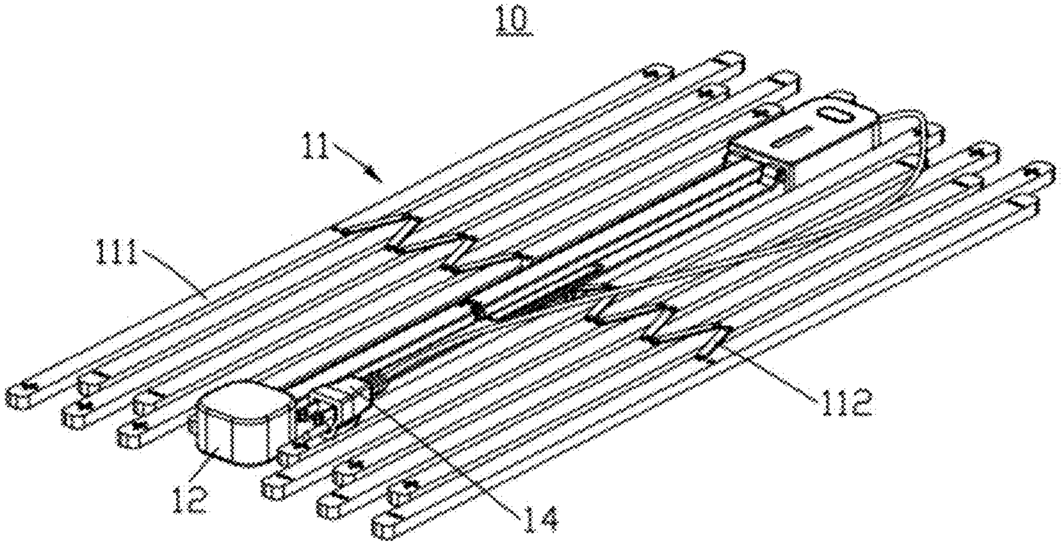
FIG. 4 is a schematic structural diagram of the electroshock rodent-catching device in another example embodiment.

Referring to FIG. 4, in some embodiments the electroshock rodent-catching device 10 need not include a mounting bracket. For example, the millimeter-wave radar 12 could be separately installed on a wall or ceiling, while the electrode array 11 is placed on the floor. In some embodiments, the electrode array 11 comprises a set of electrodes 111 arranged with gaps between them. The spacing between adjacent electrodes 111 can be adjustable—for instance, the spacing might be adjustable in a range of about 5 mm to 20 mm. The spacing can be adjusted automatically under the control of the controller 13 or manually by the user. In certain embodiments, each pair of adjacent electrodes 111 in the array is connected by a telescoping rod 112. The controller 13 can control a driving device 16 (see FIG. 3) to adjust the spacing between the electrodes 111 of the array. The driving device 16 can be, for example, a pneumatic cylinder or an electric motor that expands or contracts the telescopic rods 112, thereby varying the electrode gap.

In some embodiments, each electrode 111 is composed of a gold-plated copper foil layer and a ceramic insulating layer. The gold-plated copper foil provides good arc resistance; using gold-plated copper foil as the electrode material can extend the service life of electrode 111 by resisting arcing damage. The ceramic insulating layer serves to prevent electrical leakage between electrodes, enhancing safety. For example, the ceramic insulating layer can be implemented as a nano-ceramic insulating coating.

The millimeter-wave radar 12 of device 10 may operate similarly to the system described with FIG. 1. For instance, in some embodiments, the radar 12 performs multi-band coordinated scanning to capture the target object's dynamic parameters (such as RCS, vital signs, and motion trajectory as described). The radar 12 can operate in the 24 GHz, 60 GHz, and 77 GHz bands to detect at least one target object. In one example, the radar 12 may be a compact radar module, such as the Infineon BGT60LTR11AIP radar module, which operates in the 60 GHz band with a 7 GHz bandwidth. This radar module is capable of detecting the RCS and vital signs of multiple targets concurrently, meeting the needs of the present invention. The controller 13 analyzes the dynamic parameters detected by the radar 12 to determine the category of the target object. If the target object is determined to be a rodent, the controller 13 controls the electrode 111 to output a first voltage to electroshock the target object. By utilizing the millimeter-wave radar 12 to accurately detect the target's dynamic parameters, the system improves the accuracy of target identification. When a rodent is correctly identified, delivering an electroshock at the first voltage promptly upon detection increases the efficiency of extermination.

In the embodiment described above, if the millimeter-wave radar 12 detects that the target object still exhibits a vital sign (for example, a heartbeat or breathing signal) after the first electroshock, then the controller 13 will cause the electrode 111 to output a second voltage to electroshock the target object, wherein the second voltage is greater than the first voltage. For example, the second voltage may be a preset multiple of the first voltage (such as 1.5 times the first voltage). In this way, if the initial shock fails to kill the rodent target, the system automatically administers a second, stronger shock, thereby further improving the rodent extermination rate.

In some embodiments, upon determining that the target object is a rodent, the controller 13 can further assess the size category of the rodent (e.g., distinguishing between a small juvenile rodent and a larger adult rodent). The controller then selects a first voltage appropriate for that size category and outputs that voltage through the electrode 111 to electroshock the target object. By tailoring the magnitude of the first shock voltage to the size of the rodent, the device optimizes the lethality of the shock and increases extermination effectiveness for rodents of different sizes.

In some embodiments, the electroshock rodent-catching device 10 additionally includes the aforementioned driving device (item 16). The controller 13, after determining the size category of the rodent, may also adjust the spacing between electrodes in the electrode array through the driving device. By increasing or decreasing the gaps between electrodes to better fit the rodent's body size, the device ensures that the electroshock is delivered effectively (e.g., ensuring contact or optimal arcing distance), thereby improving the kill efficiency.

In some embodiments, the electroshock rodent-catching device 10 further includes the acoustic (sound) device discussed earlier. The controller 13 is configured such that if the target object is identified as a human, the controller immediately causes the electrode array to cease outputting any voltage (implementing a safety interlock), or if the target object is identified as a pet, the controller triggers the acoustic device to emit a sound wave in order to scare away or deter the pet from the area. In one implementation, the controller 13 may be realized by a microprocessor or a central processing unit (CPU), and the acoustic device can be a standard speaker. This configuration ensures that the presence of non-rodent entities (like people or pets) will not result in harmful electric shocks, instead activating only non-lethal deterrents for pets.

In some embodiments, the device 10 can also incorporate a fence 17 (see FIG. 3). The fence 17 includes a gate system 171 and is fixed around the perimeter of the electrode array 11, forming an enclosed space (a first containment space) to capture a target object. During normal operation of the rodent-catching device 10, the gate of the fence 17 is in an open state, allowing rodents to enter the enclosed area around the electrodes. If the millimeter-wave radar 12 detects that a target object is a rodent, the controller 13, in addition to activating the electrodes, will command the fence's gate system 171 to shut the gate, preventing the rodent from escaping from the enclosure.

In some embodiments, the device 10 may include the fence 17 but not include an electrode array 11. In such a case, the fence 17 forms a second containment space to trap the target object. If the radar 12 detects the target object to be a rodent, the controller 13 controls the fence's gate system 171 to close, thereby confining the rodent inside the fence. (This embodiment essentially functions as an intelligent cage that traps the rodent upon detection, even without an immediate electroshock; it could be used in scenarios where non-lethal capture is preferred or as an adjunct to manual extermination.) Below, with reference to FIG. 5, we describe the process flow of the rodent electroshock method according to the embodiments of the present invention.

Figure 5:
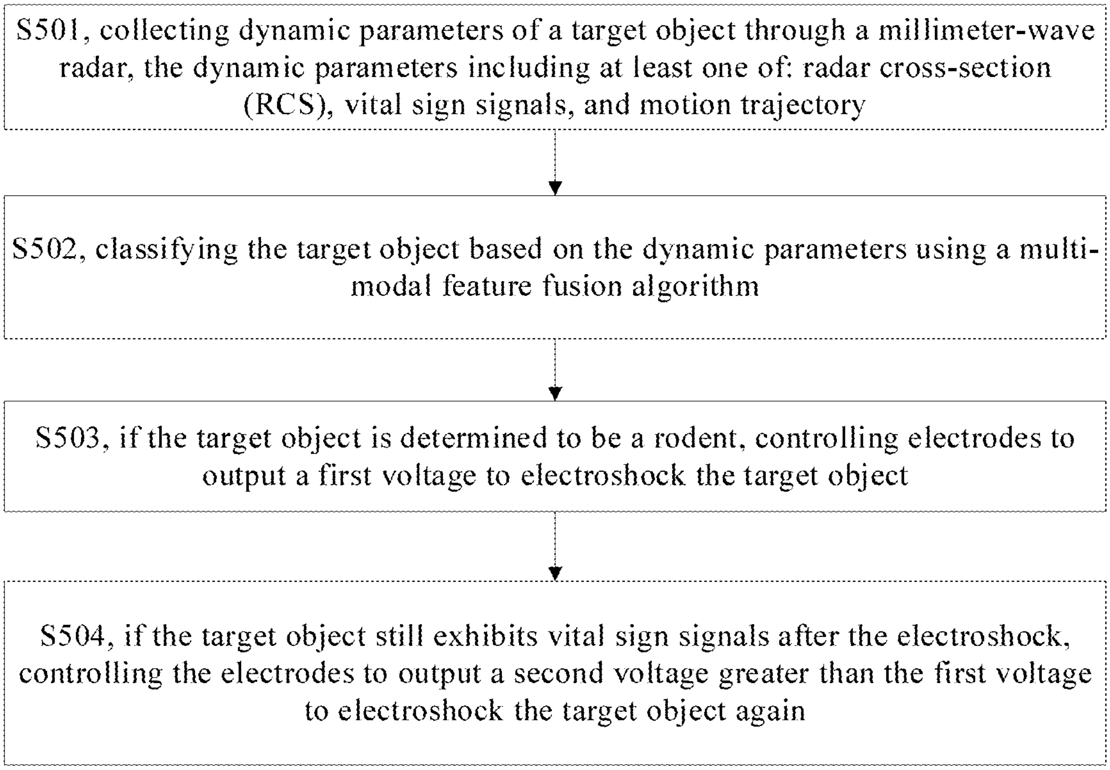
FIG. 5 is a flowchart of a millimeter-wave radar-based rodent electroshock method according to an embodiment of the present invention.

Referring to FIG. 5, a flowchart is shown illustrating an example method for electroshock rodent-catching as implemented in the device 10. The method can be executed by the controller and includes one or more steps. The steps need not be performed in the exact order depicted, and certain steps may be added, omitted, or rearranged as appropriate. One example sequence of steps is as follows.

Step S501: collecting dynamic parameters of the target object through the millimeter-wave radar. The dynamic parameters include at least one of: radar cross-section (RCS), vital sign signals, and motion trajectory of the target object.

In practice, the radar operation in this step can be as described earlier. The millimeter-wave radar transmits electromagnetic waves (for example, FMCW or pulse signals) and uses its MIMO antenna array to emit the waves and receive echoes. The radar records the transmitted signal's power and uses time-of-flight measurements to determine the distance to the target (from the echo delay). The radar computes the target's RCS based on the received echo power, distance, and known system parameters as explained above. If the target object is a living creature, the radar detects micro-Doppler modulations in the echo due to the target's subtle movements (like breathing or heartbeat). Using techniques such as STFT or EMD, the radar separates these micro-motion signals and calculates the target's respiratory and heart rates through a peak detection or autocorrelation algorithm. These rates are used as the target's vital sign signals. Additionally, the radar determines any doppler frequency offset caused by the target's movement; from this it derives the target's velocity and acceleration, using one or both as parameters of the target's motion trajectory. The outcome of step S501 is that the system obtains a set of parameters (e.g., RCS value, breathing rate, heart rate, movement speed, acceleration) characterizing the detected target object.

Step S502: classifying the target object based on the dynamic parameters, using a multi-modal feature fusion algorithm.

In some embodiments, this classification involves analyzing the combination of parameters obtained in S501 (RCS, vital signs, motion) to decide whether the target object is a rodent or some other entity. For example, the algorithm may evaluate whether the target's features fall within characteristic ranges for rodents. As mentioned in the Summary, one set of criteria for classifying a target as a rodent could be: the RCS is within a first predetermined range (e.g., between 0.001 $m^2$ and 0.01 $m^2$), the respiratory rate is within a first range (e.g., 1-3 Hz), the heart rate is within a first range (e.g., 5-9 Hz), the movement speed is below a first speed threshold (e.g., 2 m/s), and the acceleration is above a first acceleration threshold (e.g., 1 $m/s^2$). If all these conditions are met, the target is determined to be the rodent.

For instance, consider a scenario in which the target object's measured parameters are: RCS≈0.08 $m^2$, respiratory rate≈3 Hz, heart rate≈8 Hz. Suppose for this example the first speed threshold is 1.5 m/s and the first acceleration threshold is 1.5 $m/s^2$. Because 0.08 $m^2$ lies within the specified RCS range of 0.001-0.01 $m^2$, 3 Hz is within 1-3 Hz, 8 Hz is within 5-9 Hz, and (assuming the target's movement speed is below 1.5 m/s and its acceleration above 1.5 $m/s^2$) all conditions are satisfied—the system would determine that the target object is a rodent in this case. It is noted that these numeric ranges and thresholds are design choices; the exact values can be tuned based on empirical data.

In some embodiments, instead of hard-coded threshold rules, the classification may be performed by a trained machine learning model. For example, a target object recognition model—such as a fused CNN-RNN algorithm—can intake the radar's dynamic parameters and output a classification label (rodent, human, pet, etc.). This model can be trained on sample data of rodent versus non-rodent targets to achieve robust classification. Whether by algorithmic thresholds or a learned model, the outcome of step S502 is that the system knows the category of the target object.

Step S503: If the target object is determined to be a rodent, outputting a first voltage to electroshock the target object.

In this step, the controller activates the electrode array to deliver an electric shock to the rodent. The voltage level of this first shock can be preset or determined dynamically. In some embodiments, as discussed, the system may decide the magnitude of the first voltage based on the rodent's size (mass or body size). For example, the system might use a lower first voltage for a small mouse and a higher first voltage for a large rat. If the target's size is determined (e.g., through its RCS or other sensor input), the controller can select an appropriate first voltage from a lookup table or formula and apply it.

Additionally, as described earlier, the controller may adjust the configuration of the electrode array for optimal effect. If the rodent's size category is known (juvenile or adult), the spacing between electrodes can be automatically adjusted (using the driving mechanism 16) to ensure good contact or arcing when the voltage is applied. By tailoring the electrode spacing to the rodent's size, the electrical circuit formed during shocking is more effective, thereby improving the likelihood of a lethal outcome.

In some implementations of Step S503, the system includes a condition to ensure the rodent is properly positioned before delivering the shock. The millimeter-wave radar can monitor the rodent's position relative to the electrode array. If the rodent is within a defined "kill zone" (for example, the central area of the electrode platform) and remains there for at least a minimum time (e.g., 3 seconds), then the controller triggers the shock. This precaution prevents the device from discharging if a rodent is merely passing by or only partially on the electrodes. Only when the rodent is fully in position (which increases the chance the shock will be effective) does the system act. This improves the overall kill efficiency by focusing shocks on rodents that are in the optimal position to be electrocuted. The preset area and dwell time can be configured by the user; for instance, the entire area of the electrode array or a central subset of it can be designated as the trigger area, and the time threshold could be set to a value like 3 seconds as a default.

After step S503, the basic process of detecting and shocking a rodent is complete. However, the method can include additional steps or decision points to handle cases such as unsuccessful kill on the first attempt or classification of non-rodent targets, as described in the dependent claims.

Step S504: If after the first electroshock the target object still exhibits a vital sign (e.g., the radar continues to detect a heartbeat or breathing from the target), then the system proceeding to output a second voltage to electroshock the target object again.

The second voltage is higher than the first voltage. In an embodiment, the second voltage might be predetermined as, say, 1.5 times the first voltage. The rationale is that if the rodent survived the initial shock, a stronger shock is likely needed to ensure a kill. For example, if the first shock was 3 kV, the controller might increase the output to 4.5 kV for the second shock. By monitoring the target's vital signs post-shock, the system can determine whether the rodent has been killed; if not, it automatically escalates the voltage and tries again. This two-stage shocking strategy greatly improves the extermination rate for rodents that might otherwise survive an initial jolt.

Step S505: If it is detected that the target object no longer has any vital sign signal (i.e., the rodent is dead), the system can recording a successful kill.

In practice, this might involve incrementing a kill counter stored in memory and possibly logging the time of extermination. The device could maintain statistics on how many rodents have been neutralized over its deployment.

The method may also include steps for handling safety and non-rodent detections:

Human detection safety step: During the classification in step S502, if the target object's features indicate that it is a human (for example, if the RCS is very large—at or above a second threshold such as 0.1 $m^2$, which is much larger than any rodent, or other distinguishing characteristics), the system will classify it as a human. In such an event, the method immediately interrupts any high-voltage output to the electrodes. In some embodiments, as soon as a human is identified, the electrode control module cuts off power to the electrodes within a few milliseconds (e.g., within 3 ms) as a safety interlock. This prevents any accidental electric shock to a person, dramatically improving the safety of the device for household use. The second RCS threshold for human detection can be, for example, 0.1 $m^2$ (which is well above typical rodent RCS values).

Pet detection deterrence step: If the target object is classified as a pet (e.g., a cat or small dog) based on its parameters (for instance, RCS within a specified intermediate range, vital sign rates and motion indicating an animal larger than a rodent but smaller than a human, such as breathing in a second range, and movement speed below a second threshold), then the system will not energize the lethal electrodes. Instead, it will initiate a repelling action to drive the pet away harmlessly. In some embodiments, this repelling action involves using the acoustic device to emit a sound (which could be an ultrasonic tone or an alarm) for a preset duration to scare or discomfort the pet so it leaves the area. For example, the system might emit a sound for 10 seconds. If after this period the radar still detects the pet has not left, the system could escalate by activating a very low-power, non-lethal electric pulse on the electrodes as a further deterrent (for instance, a 50 V pulse with 0.1 J of energy, which is enough to startle but not harm the animal). These parameters (sound duration, pulse voltage, energy) can be configured. The second RCS range for pets might be, for instance, 0.1 $m^2$ to 1 $m^2$, and a second speed threshold might be around 2 m/s (since pets may move slower in the trap area compared to rodents).

Intrusion alert step (additional embodiment): In some embodiments, the rodent-catching device (especially if configured as a smart trap or repeller without immediate killing) can serve as a monitoring system. If a target object is determined to be a rodent intruder, the device can determine the location of the intrusion (e.g., which trap or which area of a fence is triggered) through the radar data. The device can then send an alert containing the location of the rodent intrusion to a user's device, such as a smartphone, tablet, or wearable device. For example, the device could push a notification through a mobile app, indicating that a rodent was detected in the kitchen trap at a certain time. This feature allows users to be promptly informed of rodent activity even if they are not near the device.

The above steps cover various scenarios and features of the method. Not all optional steps may be present in a given embodiment; they can be included or omitted as needed.

Figure 6:
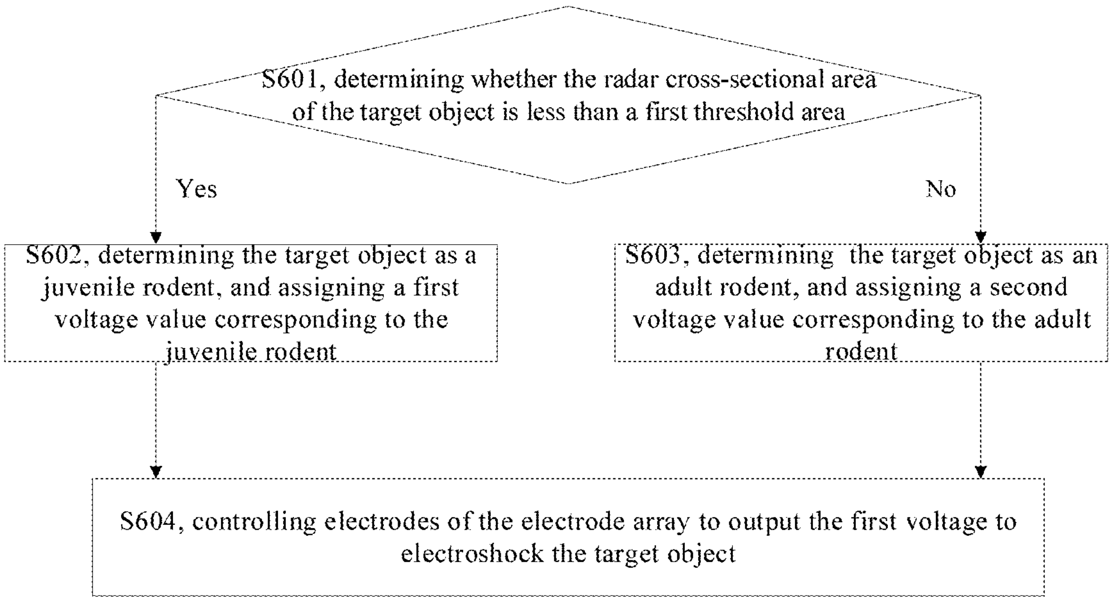
FIG. 6 is a flowchart illustrating a method of controlling the electrode voltage according to some embodiments of the present invention.

Referring to FIG. 6, a flowchart of a specific method for controlling the electrode voltage based on target characteristics is shown (this corresponds to an implementation detail of the adaptive voltage control). The method depicted in FIG. 6 can be summarized as follows.

Step S601: determining whether the target object's radar cross-sectional area (RCS) is smaller than a first area threshold.

If the target's RCS is below the first threshold, proceed to Step S602; if the RCS is greater than or equal to the first threshold, skip to Step S603 (the RCS threshold is used to differentiate between a small rodent and a larger rodent, for example).

Step S602: determining that the target object is a juvenile rodent, and setting the first voltage to a first voltage value (suitable for a small rodent).

In one embodiment, the first RCS threshold can be, for instance, 0.003 $m^2$, and the first voltage value can be 3 kV. In a particular embodiment, the first voltage may be a pulsed high voltage; for example, the device outputs a pulse of 3 kV with an energy of 0.1 J for the first shock.

Step S603: determining that the target object is an adult rodent, and setting the first voltage to a second (higher) voltage value.

In one example embodiment, the second voltage value is 8 kV (for an adult rat, for instance), delivered as a pulse of 8 kV with an energy of 0.5 J.

Step S604: controlling the electrode array's electrodes to output the first voltage to electroshock the target object.

Optionally, as mentioned earlier, if the device has adjustable electrode spacing, the system can also adjust the spacing in accordance with whether the target was categorized as juvenile or adult, to ensure the electrodes are optimally positioned. For example, the trap might close the electrodes slightly closer for a smaller rodent, and farther apart for a larger rodent, just before outputting the voltage. This synchronization of physical adjustment with appropriate voltage level can further increase the chance of a successful kill for both small and large rodents.

Figure 7:
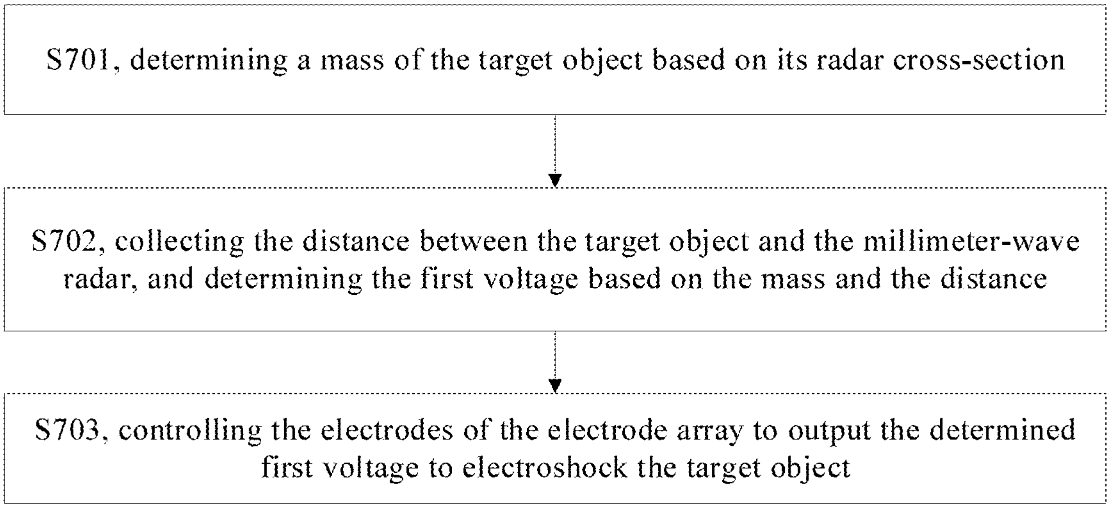
FIG. 7 is a flowchart illustrating another embodiment of a method for controlling the electrode voltage.

Referring to FIG. 7, a flowchart of another embodiment for controlling electrode voltage is shown, which emphasizes determining the shock voltage based on the target's estimated mass and distance (a more dynamic calculation approach):

Step S701: determining the mass of the target object from its radar cross-section (RCS).

In some embodiments, this is done using an empirical formula (denoted as Formula (1) in the text). For example, one relationship might be:

mass=0.12×(RCS×1000)\text {mass}=0.12\times (\text{RCS}\times 1000) mass=0.12×(RCS×1000) (This formula is illustrative; it represents a fit from empirical data correlating rodent mass to RCS, where 0.12 and 1000 are coefficients determined by statistical regression.

Essentially, given a measured RCS, the system estimates the rodent's mass using a model. These coefficients would have been obtained by analyzing sample data of actual rodents to find a reliable RCS-to-mass mapping.

Step S702: using the millimeter-wave radar to measure the distance (D) between the target object and the radar, and determining the first voltage based on the distance and the estimated mass.

In some embodiments, this uses another empirical formula (denoted as Formula (2)). For example, one relationship might be:

*V*=mass×(1500/*D*)*V*=\sqrt{\text{mass}}\times(1500/*D*)*V*=mass×(1500/*D*)

(Again, illustrative: here 1500 could be a coefficient determined by regression analysis of required voltage vs. mass and distance).

The idea is that a heavier rodent or one farther from the electrodes might require a higher voltage to ensure a fatal shock. Using the distance information ensures that if a rodent is not directly on the electrode (perhaps slightly above or to the side), the system can compensate with a higher voltage if needed.

In some embodiments, different formulas or parameters can be applied depending on whether the rodent is juvenile or adult. For example, Formula (3) might be used to determine the first voltage for juvenile rodents and Formula (4) for adult rodents. Additionally, for safety and effectiveness, the system can impose caps on the voltage: e.g., the maximum voltage output for a juvenile rodent might be limited to 3000 V (to avoid over-shocking a very small animal), and the maximum for an adult rodent might be capped at 8000 V (to ensure a strong shock for a large rodent without exceeding design safety limits).

Step S703: controlling the electrode array to output the first voltage as determined, to electroshock the target object.

In the embodiment, by calculating a voltage that matches the target rodent's estimated mass and accounting for distance, the system delivers a customized shock. This tailored approach can improve extermination efficiency because it neither under-shocks (which might let a large rodent survive) nor greatly over-shocks (which could be unnecessary or wasteful of energy or possibly riskier to surroundings) compared to the needs of the situation.

Step S704: (corresponding to the second shock logic) if after the first shock it is still detected that the target object has a vital sign (e.g., the radar detects a heartbeat or breathing), then controlling the electrodes to output a second voltage to electroshock the target object, wherein the second voltage is greater than the first voltage.

In some embodiments, the detection criterion could be explicitly the presence of a respiratory and/or heartbeat signal after shock. If such is detected, the system concludes the target has not been killed. The controller then increases the electrode output to a second voltage and triggers another shock. As mentioned, the second voltage could be, for example, 1.5 times the first voltage. The logic is: if a rodent's vital signs persist after the initial shock, escalate the voltage and shock again. This significantly increases the kill probability—e.g., after delivering a second, higher-voltage shock, the rodent's chance of survival is minimal.

After the second shock, the system can again monitor vital signs. In practice, most rodents will be neutralized by this point (as indicated, success rates exceeded 97% with a two-stage shock approach). If by some extreme chance the rodent still shows signs of life, the system could repeat the process or signal an alert for manual intervention.

Additional step (pet detection) corresponding to related repelling method: In some embodiments, the method also covers handling of pets in the manner described. If during classification the target's parameters fall within the defined "pet" category (e.g., second RCS range, second vital sign range, second speed threshold), the method includes repelling the target instead of shocking. As described, this might involve sounding an alarm and possibly emitting harmless pulses if the pet remains. These steps ensure that non-target animals are deterred rather than harmed.

Additional step (alert and tracking) corresponding to extended embodiments: As previously noted, the method can include sending alerts to the user when rodents are detected or trapped, and possibly logging the event details. This does not directly affect the trapping process but adds a useful feature for monitoring and record-keeping.

Through the above steps and embodiments, it can be seen that the invention provides a comprehensive solution for intelligent rodent detection and extermination. The system leverages sensor fusion and adaptive control to target rodents effectively while incorporating safety and reporting features.

Figure 8:
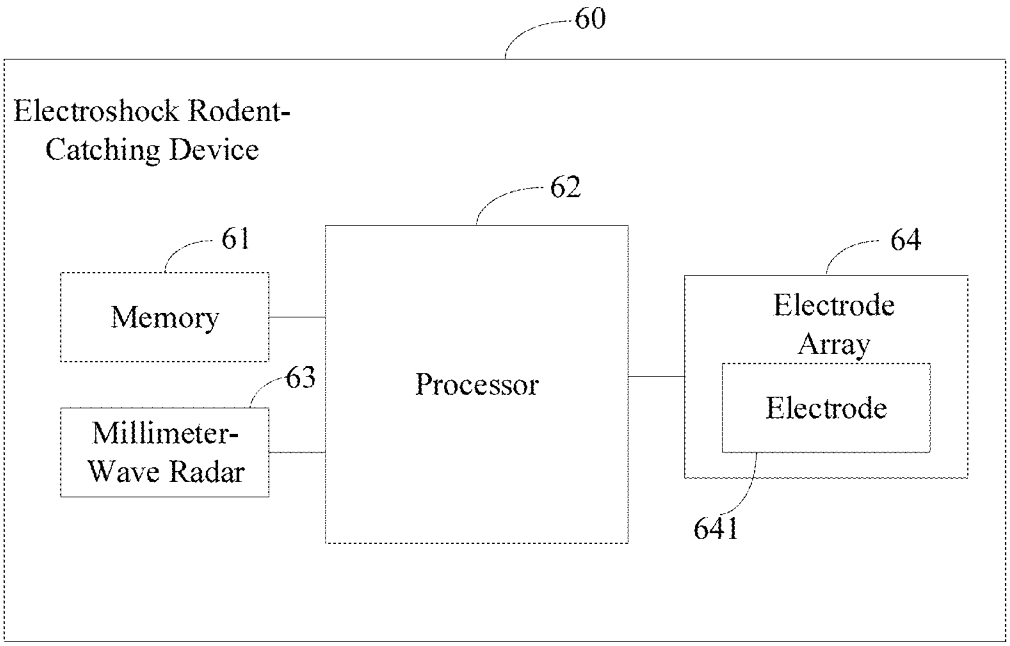
FIG. 8 is a schematic structural diagram of an electroshock rodent-catching device according to further embodiments of the present invention (showing internal components).

Referring to FIG. 8, a schematic structural diagram is shown for an electroshock rodent-catching device 60 according to some embodiments of the invention, illustrating internal components. The device 60 can include at least one memory 61, a processor 62, a millimeter-wave radar 63, and an electrode array 64. The memory 61 is a computer-readable storage medium that stores a computer program (for example, a set of logic instructions). The processor 62 executes the program instructions to perform the electroshock rodent-catching methods described above.

In some embodiments, the millimeter-wave radar 63 in device 60 operates similarly to the radar module discussed before, capable of multi-band coordinated scanning. For example, the radar 63 may scan in the 24 GHz, 60 GHz, and 77 GHz bands using a MIMO antenna array, which enhances detection resolution, range, and interference resistance while allowing quick beam steering for effective multi-target tracking over a wide area. The radar 63 provides dynamic parameter data (RCS, vital signs, motion) to the processor 62 for analysis.

In some embodiments, the electrode array 64 comprises a set of electrodes 641, each of which can include a gold-plated copper foil layer and a ceramic insulating layer (similar to the electrode structure described for electrode 111). This construction ensures durable electrodes with good conductivity and insulation between them.

The logic instructions stored in the memory 61 can be implemented as software functional units. When these instructions (or software modules) are sold or used as independent products, they can be stored in a computer-readable storage medium. Examples of a computer-readable storage medium include any tangible medium capable of storing program code, such as internal or external hard disks, read-only memory (ROM), random-access memory (RAM), flash memory devices, optical discs, etc. For instance, the program instructions corresponding to the electroshock rodent-catching method may be stored on a non-volatile memory like a flash drive, a Secure Digital (SD) card, a solid-state drive, or other memory device.

When the processor 62 runs the software program stored in the memory 61, it carries out the steps of the method embodiments described above. In The present invention embodiment, the processor 62 serves as the control center of the device 60. It can be implemented as a central processing unit (CPU) or other forms of processors such as digital signal processors (DSPs), invention-specific integrated circuits (ASICs), field-programmable gate arrays (FPGAs), or other programmable logic or discrete circuitry. The processor 62, through appropriate interfaces and connections, controls and communicates with the radar 63, the electrode array 64 (via the electrode control circuitry), the memory 61, and any other modules (such as communication modules for sending alerts, acoustic devices for repelling, etc.).

An embodiment of the invention also provides a computer program product. This program product comprises program instructions which, when executed on a computer or processor, cause the device to perform the steps of the rodent electroshock method as described. Thus, the inventive concepts can be embodied not only in physical apparatus but also as software that can be distributed and run on suitable hardware. The electroshock rodent-catching device, the computer-readable storage medium, the computer program product, or even a dedicated chip discussed in these embodiments are all means to execute the methods provided by the invention. Therefore, the beneficial effects achieved by these devices or products correspond to those achieved by the methods themselves, as detailed above, and need not be reiterated here.

It should be noted that the division of functions among modules or units described in the above embodiments is illustrative for clarity. In actual implementations, the allocation of functions can be altered according to need. For example, multiple modules or components described separately can be combined into a single module that performs all functions, or conversely, a single module's functions could be distributed across multiple components. The modular separation is logical and does not necessarily require physical separation: for instance, several "units" might be different software threads running on the same processor, or different functions within a single microcontroller. Components described as separate may be collocated or distributed in various physical configurations. One or more of the modules may be integrated together in a processing unit or realized as separate physical entities. The integrated unit(s) can be implemented in hardware, or equivalently, the functions can be implemented as software units.

If the integrated functional units are implemented as software and sold or used independently, they can be stored in a computer-readable medium. Based on this understanding, at least part of the technical solutions of the present invention (especially those that contribute over the prior art) can be embodied in the form of a software product. This software product is stored in a storage medium and contains program instructions which cause a device (such as the processor or any programmable hardware) to execute the steps of the various method embodiments described above. The storage medium may be, for example, a USB flash drive, a portable hard disk, ROM, RAM, a magnetic disk, an optical disc, or any medium capable of storing program code.

The foregoing embodiments are provided to explain the technical solutions of the present invention and not to limit them. Although the present invention has been described in detail with reference to the preferred embodiments, those skilled in the art will understand that various modifications, substitutions, and improvements can be made to the described embodiments without departing from the spirit and scope of the invention as defined by the appended claims. All such modifications and equivalents are intended to be included within the scope of the present invention.

What is claimed is:

1. An electroshock rodent-catching device comprising:

an electrode array exposed to an external environment;

a millimeter-wave radar configured for detecting dynamic parameters of a target object; and a controller, communicatively coupled to the millimeter-wave radar and the electrode array;

a non-transitory storage medium coupled to the controller and configured to store a plurality of instructions that when executed cause the controller to:

identify the target object based on the dynamic parameters detected by the millimeter-wave radar;

in a case that the target object is identified as a rodent and contacts the electrode array, control the electrode array to perform a first electroshock based on an initial electroshock voltage; and control the millimeter-wave radar to detect the target object after performing the first electroshock, and in a case that a vital sign signal of the target object is detected, control the electrode array to perform a second electroshock with an enhanced voltage higher than the initial electroshock voltage.

2. The electroshock rodent-catching device according to claim 1, wherein the electroshock rodent-catching device further comprises a bracket, and the millimeter-wave radar is mounted on the bracket.

3. The electroshock rodent-catching device according to claim 1, wherein the dynamic parameters comprise a radar cross section (RCS), and identifying the target object based on the dynamic parameters detected by the millimeter-wave radar comprises:

in a case that the RCS is less than an RCS threshold, identifying the target object as a rodent;

in a case that the RCS is greater than or equal to the RCS threshold, identifying the target object as a human or a pet.

4. The electroshock rodent-catching device according to claim 3, wherein the plurality of instructions, when executed, further instruct the controller to:

in the case that the target object is identified as a human or a pet, disable the electrode array from outputting a voltage.

5. The electroshock rodent-catching device according to claim 3, wherein the electrode array comprises a plurality of electrodes, and the plurality of instructions, when executed, further instruct the controller to:

identify a size of the target object according to the RCS of the target object;

determine a spacing between adjacent electrodes according to the size of the target object, and adjust each of the plurality of electrodes according to the spacing.

6. The electroshock rodent-catching device according to claim 5, wherein the electroshock rodent-catching device further comprises telescopic rods and a driving device connected to the controller, the plurality of electrodes of the electrode array is configured to be connected each other via the telescopic rods, wherein the plurality of instructions, when executed, further instruct the controller to:

according to the spacing, control the driving device to adjust the telescopic rods.

7. The electroshock rodent-catching device according to claim 6, wherein the driving device is a pneumatic cylinder or an electric motor.

8. The electroshock rodent-catching device according to claim 3, wherein the dynamic parameters further comprises the vital sign signal and a motion trajectory parameter, wherein the vital sign signal comprises a respiratory rate and a heart rate, and the motion trajectory parameter comprises a movement speed and an acceleration; and wherein identifying the target object based on the dynamic parameters detected by the millimeter-wave radar comprises:

in a case that the RCS is within a first RCS range, the respiratory rate is within a first respiratory rate range, the heart rate is within a first heart rate range, the movement speed is less than a first speed threshold, and the acceleration is greater than a first acceleration threshold, identifying the target object as the rodent.

9. The electroshock rodent-catching device according to claim 3, wherein the plurality of instructions, when executed, further instruct the controller to:

obtain a distance between the target object and the millimeter-wave radar from the millimeter-wave radar;

determine the initial electroshock voltage based on the RCS and the distance.

10. The electroshock rodent-catching device according to claim 9, wherein determining the initial electroshock voltage based on the RCS and the distance comprises:

determining a mass of the target object according to the RCS;

determining the initial electroshock voltage further according to the mass.

* * * * *